Aug. 4, 1925.
R. C. RUSSELL
CARD INDEX
Filed Oct. 29, 1924
1,548,212
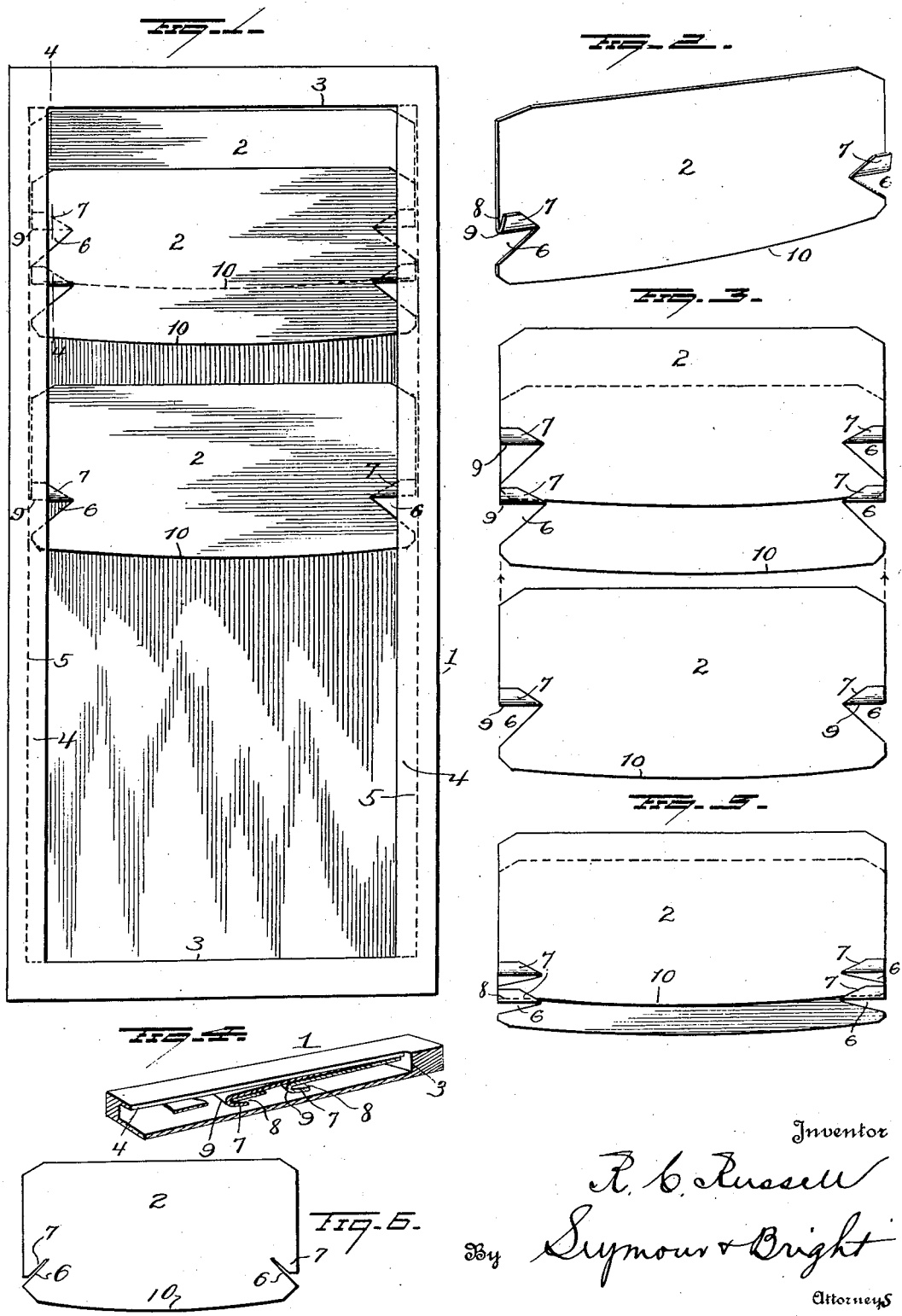

Patented Aug. 4, 1925.

1,548,212

UNITED STATES PATENT OFFICE.

ROBERT C. RUSSELL, OF PITTSBURGH, PENNSYLVANIA.

CARD INDEX.

Application filed October 29, 1924. Serial No. 746,636.

*To all whom it may concern:*

Be it known that I, ROBERT C. RUSSELL, a citizen of the United States, and a resident of Pittsburgh, in the county of Allegheny and State of Pennsylvania, have invented certain new and useful Improvements in Card Indexes; and I do hereby declare the following to be a full, clear, and exact description of the invention, such as will enable others skilled in the art to which it appertains to make and use the same.

This invention relates to improvements in card indexes and has reference more particularly to those of the "visible" type,—one object of the invention being to so construct the index that the cards or elements thereof shall be supported, one by another in uniformly spaced relation so that the exposed portions of all the index elements shall be uniform in size, and so that all of the index elements shall be movably and removably supported by the holder.

A further object is to provide each index element with supporting means for another index element, which supporting means may be so disposed that the exposed portions of the index elements may be varied as desired to adapt the index for the reception of different amounts of index data on the index elements.

With these and other objects in view, the invention consists in certain novel features of construction as hereinafter set forth and pointed out in the claims.

In the accompanying drawings,—

Figure 1 is a face view showing an index embodying my invention.

Figure 2 is a rear view in perspective of one of the index elements.

Figure 3 is a rear face view showing several index elements.

Figure 4 is a fragmentary section view on the line 4—4 of Figure 1.

Figure 5 is a rear face view similar to Figure 3 but showing the arrangement to provide a reduced area of the exposed portions of the index elements, and Figure 6 is a view of an index element blank.

The holder 1 for the index elements 2 may be conveniently made of metal and elongated in form, having shoulders 3—3 near its respective ends and provided at its sides with flanges 4 overlying the body portion of the holder and spaced therefrom to provide guide-ways 5 into which respective ends of the several index elements 2 project.

Each index element 2 may be made of cardboard or other suitable flexible material and each end is slitted as at 6 to form a tongue 7 which is bent upwardly and provides a pocket 8 near each end of the index element. The bend 9 at the juncture of each tongue 7 with the card or element is preferably curved as shown in Figures 2 and 4. The tongues 7 enter the guide-ways 5 of the holder and have such resilience as to make frictional engagement with the bottoms of said guide-ways sufficient to insure retention of the index element normally in proper position. In slitting the ends of the index elements, the tongues 7 and therefore the pockets 8 may be formed at different positions relative to the vertical end edges of the index element in order to vary the area of the exposed portions of the index elements, one index element being supported in the pocket 8 of the adjacent index element. In order to facilitate the assembling of the index elements without annoying conflict with each other, the outline of the lower edge of each index element will preferably be curved as shown at 10.

In Figures 2 and 3 of the drawing, the notches 6 and pockets 8 are located appreciable distances above the lower edges of the index elements so as to provide comparatively wide exposed data-receiving portions. Should it be desired to make the exposed portions larger, the cards or index elements would be so slitted as to locate the pockets nearer the upper portions of the cards, but should it be desired that the exposed portions of the index elements should be narrow, said index elements would be so notched at their ends as to provide the pockets 8 near the lower edges, as illustrated in Figure 5.

Having fully described my invention what I claim as new and desire to secure by Letters-Patent, is:

1. In a card index, an index element having slits extending inwardly from its respective ends and the material of the card bent upwardly and rearwardly at the upper edges of said notches and forming pockets.

2. In a card index, an index element having slits extending inwardly from respective ends thereof, the material of the card being bent rearwardly and upwardly at the upper edges of said notches and forming resilient tongues providing pockets.

3. In a card index, an index element having slits extending inwardly from its respective ends, the material of the card being bent rearwardly and upwardly from the upper edges of said notches, the lower edge of said index element being curved in outline.

4. In a card index, the combination with a holder having guide-ways at its edges, of a plurality of index elements, each having slits in its respective ends, said slits extending inwardly from the respective ends of the element and forming tongues which are bent rearwardly and upwardly from the upper edges of said slits, the end portions of the elements and said tongues entering the guide-ways of the holder, said index elements being so assembled in the holder that the bottom portion of one index element will be supported in the pockets formed by the tongues of an adjacent index element.

In testimony whereof, I have signed this specification in the presence of two subscribing witnesses.

ROBERT C. RUSSELL.

Witnesses:
JAMES S. ATKINSON,
EMMA M. WALLISCH.